United States Patent
Weng et al.

(10) Patent No.: US 8,924,853 B2
(45) Date of Patent: Dec. 30, 2014

(54) APPARATUS, AND ASSOCIATED METHOD, FOR COGNITIVELY TRANSLATING MEDIA TO FACILITATE UNDERSTANDING

(75) Inventors: Jianfeng Weng, Kanata (CA); Andrew Mark Earnshaw, Kanata (CA)

(73) Assignee: Blackberry Limited, Ontario (CA)

( * ) Notice: Subject to any disclaimer, the term of this patent is extended or adjusted under 35 U.S.C. 154(b) by 446 days.

(21) Appl. No.: 13/268,269

(22) Filed: Oct. 7, 2011

(65) Prior Publication Data
US 2013/0091429 A1    Apr. 11, 2013

(51) Int. Cl.
| | |
|---|---|
| G06F 3/048 | (2013.01) |
| G06F 3/00 | (2006.01) |
| G06F 17/28 | (2006.01) |
| G06F 17/30 | (2006.01) |

(52) U.S. Cl.
CPC .............. *G06F 3/048* (2013.01); *G06F 17/28* (2013.01); *G06F 17/30746* (2013.01); *G06F 17/30796* (2013.01)
USPC ........................... 715/716; 715/717; 715/781

(58) Field of Classification Search
CPC .............. G06F 17/28; G06F 17/30746; G06F 17/30796
USPC .......................................... 715/716, 717, 781
See application file for complete search history.

(56) References Cited

U.S. PATENT DOCUMENTS

| | | | | |
|---|---|---|---|---|
| 7,054,818 B2* | 5/2006 | Sharma et al. | ................ | 704/270 |
| 7,283,973 B1* | 10/2007 | Loghmani et al. | ......... | 705/26.41 |
| 7,356,470 B2* | 4/2008 | Roth et al. | ..................... | 704/270 |
| 7,822,191 B2* | 10/2010 | McKinzie et al. | ....... | 379/355.07 |
| 7,904,298 B2* | 3/2011 | Rao | ................................ | 704/270 |
| 7,925,243 B2* | 4/2011 | McGary | ..................... | 455/414.1 |
| 7,932,892 B2* | 4/2011 | Chen et al. | .................... | 345/156 |
| 8,131,556 B2* | 3/2012 | Barton et al. | .............. | 704/270.1 |
| 8,190,420 B2* | 5/2012 | Kadirkamanathan et al. | .... | 704/8 |
| 8,204,739 B2* | 6/2012 | Waibel et al. | .................... | 704/10 |
| 8,306,509 B2* | 11/2012 | Sigmund et al. | ............. | 455/413 |
| 8,401,840 B2* | 3/2013 | Kadirkamanathan et al. | .... | 704/8 |
| 8,407,052 B2* | 3/2013 | Hager | .......................... | 704/244 |
| 8,442,496 B2* | 5/2013 | Sigmund et al. | ............. | 455/413 |
| 8,549,400 B2* | 10/2013 | Erol et al. | ..................... | 715/249 |
| 8,549,569 B2* | 10/2013 | Casagrande et al. | ........... | 725/94 |
| 2008/0300872 A1* | 12/2008 | Basu et al. | ..................... | 704/235 |
| 2009/0281789 A1* | 11/2009 | Waibel et al. | ..................... | 704/3 |
| 2012/0022867 A1* | 1/2012 | Ballinger et al. | ............. | 704/235 |
| 2012/0316860 A1* | 12/2012 | Reitan | ............................... | 704/2 |
| 2013/0262078 A1* | 10/2013 | Gleadall et al. | ................... | 704/3 |
| 2014/0163957 A1* | 6/2014 | Tesch et al. | ...................... | 704/9 |
| 2014/0164371 A1* | 6/2014 | Tesch et al. | .................. | 707/731 |
| 2014/0164506 A1* | 6/2014 | Tesch et al. | .................. | 709/204 |
| 2014/0164507 A1* | 6/2014 | Tesch et al. | .................. | 709/204 |

* cited by examiner

*Primary Examiner* — David Phantana Angkool
(74) *Attorney, Agent, or Firm* — Wolff & Samson PC (57) ABSTRACT

An apparatus, and an associated method, facilitates user understanding of the audio component of media that is played back at a device having media player functionality. Responsive to detection of user selection, a portion of the audio component of the media is converted into textual, or other, form to provide a converted-form representation of the audio component portion. The representation is displayed to the user. The representation is further translatable into a second language, and the translated, representation is displayed to the user.

16 Claims, 4 Drawing Sheets

APPARATUS, AND ASSOCIATED METHOD, FOR COGNITIVELY TRANSLATING MEDIA TO FACILITATE UNDERSTANDING

The present disclosure relates generally to a manner by which to present media having an audio component, such as an audio book, in a form that facilitates user understanding of the media. More particularly, the present disclosure relates to an apparatus, and an associated method, by which to present a selected part of the audio component of the media in a different, e.g., textual, form.

When provided in textual form, the textual representation may be viewable in the same language as the language in which the audio component is played back. Or, the textual representation may be viewable in a different language by translating the textual representation into a different language. Viewing of the textual representation reinforces user understanding of the audio component. The selected part of the audio component may be further accessible to the user in translated, audio form. Or, a visual representation of the selected part of the audio component may be provided.

BACKGROUND

Recent years have been witness to many technological advancements. These advancements have permitted the development, manufacture, and use of many new devices that provide many new functionalities and services.

For instance, many new consumer electronic devices are available, often at economical prices, and which provide many varied functionalities. Communication devices, such as wireless devices operable in cellular, and other, radio communication systems, are exemplary of electronic devices that utilize advancements in technology to provide for voice and data communication services. A wireless device operable in a cellular, or analogous, radio communication system communicates with a communication endpoint by way of a communication network. The communication network may include a radio access network that is installed over a geographical area. When the wireless device is positioned at a location within the coverage area of the network and the wireless device is granted access to the network, a communication service can be carried out between the wireless device and the communication endpoint.

Wireless devices are typically of small dimensions and thereby readily permit the wireless devices to be hand carried. A wireless device is carried, e.g., in a shirt pocket or purse of a user when not in use and is easily retrieved when needed, such as to send or receive a call or data communication.

Additional functionalities are sometimes added to, and incorporated in, a wireless device. Such devices are sometimes referred to as multifunctional devices. Functionalities provided to wireless devices are sometimes used in conjunction with the communication capabilities of the wireless devices. Or, the functionalities are used independent of the communication functionality of the device.

Media player functionality is exemplary of functionality that is sometimes incorporated into a wireless device. Media player functionality is also regularly utilized in standalone devices, i.e., devices that do not include communication connectivity capability. Media player functionality provides for playback of media, such as audio media or multimedia. Media downloaded to, or stored at, the device is played back in human perceptible form. A streaming media application is exemplary of a media playback service that is often times utilized by media player functionality installed on a wireless, or other communication, device. Media stored at a memory element of the device may be played back without need for a communication connection with a remote location.

One type of media player is sometimes referred to as E-book reader for the reason that the media which is played back during operation of the media player comprises, in significant part, textual material, such as the text of a literary work. E-book readers are typically capable of storing and playing back, i.e., displaying, data corresponding to significant amounts of textual material. A single E-book reader, for instance, is capable of storing multiple volumes, each, e.g., a separate literary work.

A media player having E-book functionality permits a media consumer, i.e., a reader, to have access to a large number of literary works without the need to carry or maintain a library of physical books containing the substance of the literary works. When traveling, for instance, the reader need only carry the E-book reader with the data forming the literary content stored thereat. The reader need not carry all of the literary works that the reader might want to view. Additionally, when the E-book reader functionality formed of a media player embodied at a communication device, such as a wireless communication device, additional content is readily downloadable to the device.

Audio books may also be played back at a media player to provide a media consumer, i.e., a listener, with audio content formed of the text of a literary work, played back in audio form.

Audio books are advantageously utilized by media consumers to receive content when the media consumer would otherwise be unable to read the content if presented in textual form. For instance, when the media consumer is operating a motor vehicle, the media consumer is unable to direct attention to read a textual representation of a literary work, but the media consumer is able to listen to audio content. Additionally, media consumers having impaired visual acuity are able to receive the content in audio form.

Audio books and other spoken, audio content are sometimes utilized by individuals learning a new language or practicing a language other than their native language. Listening to audio content played out at a device having media player functionality provides the media consumer with audio content which can be repeatedly played back to reinforce understanding of the content.

Existing devices having media player functionality, however, generally do not take advantage of the textual content upon which audio books, and other audio content, is typically based. Improvement to the existing art would therefore be advantageous.

It is in light of this background information related to devices having media playback functionality that the significant improvements of the present disclosure have evolved.

DETAILED DESCRIPTION

The present disclosure, accordingly, advantageously provides an apparatus, and an associated method, by which to intelligently provide or present media having an audio component, such as an audio book, in a form that facilitates user understanding of the media.

Through operation of an implementation of the present disclosure, a manner is provided by which to provide a selected portion of the audio component of the media in textual, or other, form.

In one aspect of the present disclosure, the textual representation is viewable in the same language as the language in which the audio component is presented. Or, the textual representation is viewable after translation into a language different than the language in which the audio component is presented.

In another aspect of the present disclosure, playback of media having audio content is selected by a media consumer by way of an input actuator that provides for the input of control commands that control, e.g., the selection of media to be played back as well as characteristics of the played-back media, such as the volume at which the media is played back.

In another aspect of the present disclosure, the user interface provides for the playback of the content both in audio form and viewable in visual form, such as a textual representation of the media or a graphical representation of the media.

In another aspect of the present disclosure, media is selected for playback. During playback, a media consumer of the content, i.e., a listener to the audio component of the media, is further capable of selecting a portion of the played-back content for additional review. The selection is evidenced, e.g., by way of actuation of an input actuator of the user interface.

In another aspect of the present disclosure, the time at which the selection input is entered is determinative of the portion of the audio component that is selected for further review. The input forms a temporal indication of the selection. The temporal indication is used to identify the portion of the media, i.e., the portion of the audio component, that is of interest. The portion is identified by identifying the portion of the audio component that is within a time window that includes a time corresponding, or related, to the temporal indication. Or, a word, phrase, sentence, paragraph, or other part of the audio component associated with, or otherwise identified with, the temporal indication is identified.

In another aspect of the present disclosure, the identified portion of the audio component is accessed, and the audio component is converted into textual form, such as by a speech-to-text converter. In another aspect of the present disclosure, the textual representation of the audio component portion provided by the speech-to-text, or other, converter is provided to a display element, such as a viewing screen of a user interface. A media consumer is able to read the textual representation associated with the selected audio component portion. Thereby, the understanding of the media consumer of the audio content is facilitated or reinforced.

In another aspect of the present disclosure, the textual representation of the selected audio component portion is translated by a language translator into a different language, i.e., a language different than the language in which the selected audio component portion is delivered. The textual representation, once translated into the different language, is viewable, e.g., at a display screen of a user interface, by a media consumer. Through appropriate selection of the language into which the textual representation is translated, the media consumer is able to view the textual representation corresponding to the selected audio component portion in a language that best facilitates understanding of the audio component portion.

In another aspect of the present disclosure, the textual representation, once translated, is converted into audio form, such as by a text-to-speech converter. The translated audio is then played back.

In another aspect of the present disclosure, the textual representation into which the selected audio component portion is converted is analyzed to ascertain key words. One or more key words, if contained in the textual representation, are associated with one or more images, representations of which are stored at a database. The image, or other graphical representation, is displayable at a display device, such as the display element of a user interface.

In another aspect of the present disclosure, the playback of the media and audio component portion thereof is affected by the rate at which a consumer of the content requests additional review of portions of the audio component of the media. The playback of the media is slowed when the rate at which requests are made is frequent, i.e., a rate at which the requests are made is high. By slowing the playback of the media, a media consumer is better able to understand the audio content thereof.

In one implementation, the audio component is slowed by use of a time-delay buffer that permits the amount of delay to be increased or decreased, as needed.

Thereby, a consumer of the media having the audio component is better able to understand the audio component by viewing textual representations or images representative of the audio component.

In these and other aspects, therefore, an apparatus, and an associated method, is provided for a device having media playback functionality. A detector is configured to detect selection of a selected media portion of media played back by the media playback functionality. A text provider is configured to provide a textual representation of the selected media portion.

Figure 1:
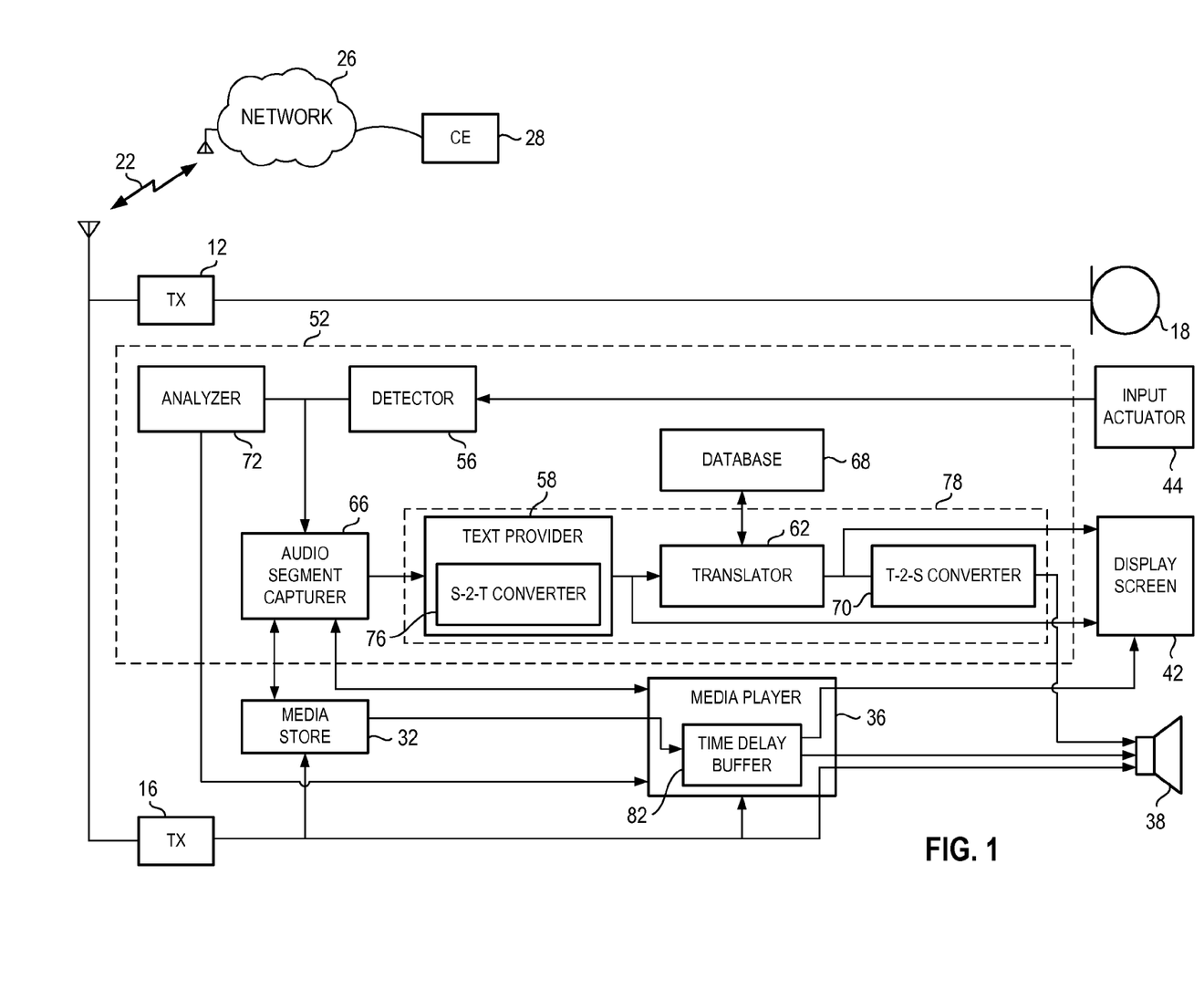
FIG. 1 illustrates a functional block diagram of a device having media player functionality operable pursuant to an implementation of the present disclosure.

Turning first, therefore, to FIG. 1, an electronic device 10 provides for media player functionality by which to play back media stored on, or provided to, the device 10.

In the exemplary implementation, the device 10 forms a wireless device capable of communicating by way of radio channels with a remotely-positioned communication endpoint. Here, the device 10 forms a wireless device operable in general conformity with the operating protocols of an appropriate communication standard specification. In other implementations, the device forms a wireline-connectable device, or the device forms a standalone device.

The device 10, in the exemplary implementation, includes transceiver circuitry, here represented by a transmit part 12 and a receive part 16 that transceive communication signals. Transmit signals, e.g., comprised of information transduced at the microphone 18 are caused to be transmitted by the transmit part 12, and signals sent to the device 10 are received by the receive part 16. Communication signals sent by, and to, the device 10 are communicated by way of, here, communication channels 22 defined upon a radio air interface formed between the device 10 and a communication network 26. The communication network defines a coverage area that, when the device 10 is positioned therewithin, the wireless device 10 is, if granted access to the network, able to communicate with, and by way of, the communication network 26. The communication network 26 is representative of the networks of any of various communication systems, both wireline and wireless, such as cellular communication systems, WiFi communication systems, etc.

A communication endpoint (C.E.) 28 is placed in communication connectivity with the communication network 26. When so-connected, data can be communicated between the communication endpoint 28 and the device 10.

In exemplary operation, data sourced at the communication endpoint 28 is provided to the device 10 by way of the communication network 26, and communication channels 22 defined upon the radio air interface. The data comprises, e.g., media, such as multimedia having an audio component or audio media having an audio component. The communicated media is received at the receive part 16 and variously stored at a storage element, here a media store 32 or streamed more directly to a media player 36. The media player causes playback of the media, which is converted into human perceptible form at an output element of a user interface, here a speaker 38 or a display screen 42, depending upon the content-type of the media.

As noted previously, content of the media played back by a media player may include spoken audio, often times referred to as an audio book in which the text of a literary work is provided in audio form, i.e., spoken by a reader. The media, whether streamed to the device 10 or retrieved from the media store 32, is caused to be played back by the media player 36 and presented to a media consumer, i.e., a listener, by way of the speaker 38.

As also noted previously, audio books are sometimes utilized by listeners who are learning a new language. By listening to the audio book, the listener learns to understand or practices understanding the aural presentation of the content of the literary work. While the audio content is based upon the text of the literary work, a listener of the audio content is typically able only to manually cross reference the written text of the literary content with some difficulty. If the listener misunderstands the words of the played-back audio, the listener, even if able to access the written text of the literary work, would be unable to search for the corresponding text of the played-back audio.

The device 10 includes an apparatus 52 of an implementation of the present disclosure. The apparatus is formed of functional elements, implementable in any desired manner including, for instance, hardware elements, firmware elements, program code executable by processing circuitry, and combinations thereof. The apparatus forms, e.g., a device processor or controller.

The apparatus here includes a detector 56, a text provider 58, a translator 62, and an audio segment capturer 66, a database 68, a text-to-speech converter 70, and an analyzer 72.

During play-back of the audio book or other media having an audio component, the consumer of the content may select for further review portions of the played-back media. The listener makes the selection, e.g., to review in further detail a portion of the played-back audio component of the media. The listener causes generation of an input command when a decision is made to review in further detail the portion of the audio component of the media. The input is generated here by way of actuation of the input actuator 44. The input is detected by the detector 56. Responsive to the detection of the input command, the detector identifies a portion of the audio component of the media conforming to the input command entered by the listener of the audio playback. In the exemplary implementation, the identification is made responsive to a temporal indication of the input command, that is to say, the time of entry of the input command relative to the playback of the audio component of the media. In one implementation, the temporal indication is used to form a time window, and audio media played back within the time window is identified. In another implementation, the temporal indication is used to identify a word, phrase, sentence, paragraph, or other portion of the played-back audio component associated with the time identified by the temporal indication. For instance, the time at which the input command is detected is referenced against the playback of the audio component, and the word, phrase, sentence, paragraph, or other portion played back at the time of detection is identified as the selected audio component of interest.

Responsive to the identification by the detector 56, the audio segment capturer 66 captures the identified audio component portion of the media. The segment capturer, e.g., accesses the media player 36 to capture the identified audio component portion of the media, or the segment capturer accesses the media store 32 to obtain the component portion to the media store at the media store 32 or from the media player 36. Once captured, the captured media portion is provided to the text provider 58. In the exemplary implementation, the text provider is formed of, or includes, a speech-to-text converter 76 that converts the audio component of the media into textual form. The text provider provides a textual representation of the selected audio component portion of the media. This textual representation is provided to the display screen 42 of the user interface. The textual representation is displayed at the display screen to permit the media consumer to read the textual representation corresponding to the selected audio component portion. By reading the textual representation, improved understanding of the played-back audio component is achieved. In one implementation, the textual representation is displayed together with additional playback of the identified and captured audio component, permitting the media consumer both to listen to and to read the content of interest. In one implementation, for example, the media consumer is able to select multiple playback of the audio component portion, thereby to reinforce listener understanding of the audio component portion. If the textual representation is longer than can normally be displayed on a display screen, such as a lengthy paragraph of textual material, the textual representation may be scrolled, upon the display screen or displayed in any appropriate manner.

The textual representation may be further provided to the translator 62. The translator operates to translate the textual representation into a different language. That is to say, the textual representation, in a first language, is translated by the translator 62 into a second language, and a translated, textual representation of the selected audio component portion of the media is provided for display at the display screen 42.

In one implementation, translation is performed only when selected by the media consumer. Additionally, the language into which the textual representation is translated is also selectable, such as by the media consumer. By providing for display of the textual representation in a language different than the language in which the audio component portion is played back, the consumer of the media and the textual representation thereof is able to read the translated, textual representation in, e.g., the native language of the media consumer. Thereby, the media consumer is able to view the textual representation in the native language of the media consumer that corresponds to the selected portion of the audio component. Understanding of the selected audio component portion by the media consumer is therefore facilitated.

In one implementation, translation by the translator is made of selected words of the textual representation rather than the entirety of the textual representation. In a further implementation in which only selected words of the audio component portion of interest are translated, usage examples or other information related to the selected words are also provided by the translator for display at the display element 42.

In an alternate implementation, the translator forms a visual translator that translates keywords of the textual representation into visual images. Visual images are not language-dependent, and the display of the images associated with the selected keywords of the textual representation provide a visual image to a media consumer to facilitate understanding of the selected audio component. In one implementation, the selection of the keywords utilizes a knowledge base maintained at the database 68. In one implementation, the knowledge base identifies words which are considered to be difficult, and keyword translation is performed when the textual representation contains a word which is contained in the database. In another implementation, the knowledge base is self-learning in that the database entries are dynamically updatable taking into account, for instance, the selection made by the consumer of the audio component of the media.

The translated, textual representation provided by the translator 62 is further provided to the text-to-speech converter 70. The converter 70 converts the translated, textual representation into audio form for playback in audio form.

In an alternate implementation, the database 68 is located remote from the device 10 rather than, as illustrated, at the device 10. In one alternate implementation, for instance, the communication endpoint 28 forms a computer server having contents that are accessible by the device 10. In another implementation, a local dictionary is formed of a first database 68 at the device 10 that is permitting of automatic, integrated access during operation of the apparatus 52. The local dictionary is first accessed. If the local dictionary does not include word translation for identified words of the textual representation provided by the text provider, then a database embodied at the communication endpoint 28 or other remote location is accessed. In this implementation, the database is distributed at more than one physical entity. If translation is to be performed of strings of words, such as sentences or paragraphs, then, in this implementation, access to the server and the greater computational capabilities of the server are utilized for the translation.

In a further implementation, the detections made by the detector are provided to the analyzer 72 and, analyzed thereat. This analysis is used to control aspects of playback of subsequently played-back media. For instance, if the analysis by the analyzer indicates a high rate of input actuation by a media consumer, the media consumer is likely to be having difficulty understanding the audio playback. Responsive to such an analysis and detection of the high rate of the input commands, the analyzer causes the media player to slow the playback of the media.

Playback in any of these forms is selectable, and the text provider, translator, and text-to-speech converter comprise a converted-form media provider 78.

In the exemplary implementation, the media player includes a time-delay buffer 82 that provides for the change in the speed at which the media is played back. In one implementation, the media player forms a cognitive player that automatically recognizes gaps between words in the audio component provided for playback. The gaps may then be increased slightly in order to slow the playback of the media. The playback of the media is a unidirectional playback, permitting appropriate buffering and processing of the media prior to being played back. Analysis is performable in advance to achieve functionality such as identifying gaps between words and sentences. The time-delay buffer 82 is used, e.g., to buffer the media for a designated amount of time, such as one second. The buffering permits the media segment to be accessed and processed prior to playback of the media. The rate of playback may then be adjusted by inserting additional audio samples, e.g., silent samples between words, into the time-delay buffer.

In one implementation, the media store 32 also stores the text of the audio component of the media played back by the media player. The media store stores, e.g., both an audio book and an E-book of a literary work. In this scenario, the speech-to-text converter operates to synchronize the playback of the media with the corresponding text of the stored text.

Figure 2:
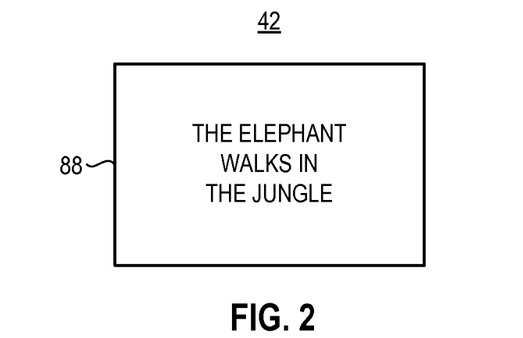
FIG. 2 illustrates an exemplary textual representation associated with selected audio content, selected pursuant to operation of an implementation of the present disclosure.

FIG. 2 illustrates an exemplary display generated upon the display screen 42 that forms a portion of the device 10 shown in FIG. 1. Here, a textual representation 88, is generated by the text provider 58, shown in FIG. 1. The textual representation represents, in textual form, the selected audio component portion of the played-back media. In this exemplary representation, the text provider provides a sentence that textually represents the portion of the audio component of the played-back media which is played back when the media consumer causes generation of an input command for additional review of the played-back content. As mentioned previously, in one implementation, concurrent with the display of the textual representation, the corresponding audio component of the media portion is also played back, thereby providing a media consumer both with an aural representation of the portion and the textual representation thereof.

Figure 3:
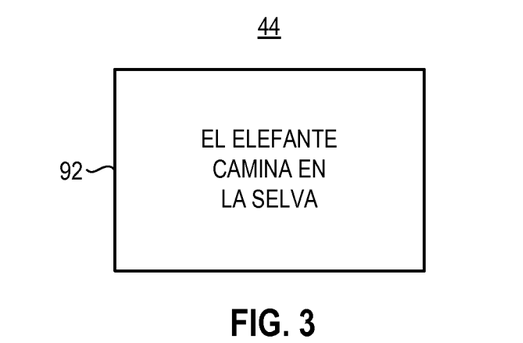
FIG. 3 illustrates a textual representation, similar to that shown in FIG. 2, but representative of a further implementation of the present disclosure.

FIG. 3 also illustrates an exemplary display displayed upon the display screen 42 during operation of an implementation of the present disclosure. The textual representation 92 is a sentence, corresponding to the sentence of the textual representation 88 shown in FIG. 2, but has been translated into a second language. The textual representation 92 is the textual representation formed by the translator 62. In the exemplary implementation, the language into which the textual representation is translated is set by the user of the device 10. Thereby, a translated, textual representation of the audio component portion selected by the user in the language most appropriate to facilitate the understanding of the content by the user is able to be made.

Figure 4:
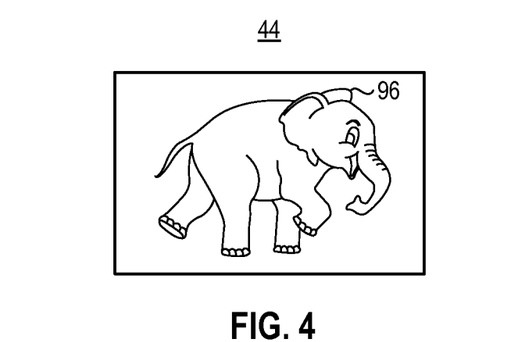
FIG. 4 illustrates a representation, analogous to those shown in FIGS. 2-3, but illustrating operation of a further implementation of the present disclosure.

FIG. 4 also illustrates an exemplary display displayed upon the display screen pursuant to operation of an implementation of the present disclosure. In this implementation, an image 96 is displayed on the display screen. The visual image is provided by the translator 62, shown in FIG. 1, that translates the textual representation provided by the text provider 58, also shown in FIG. 1, into a visual image based upon keywords of the textual representation. The visual image is language-independent, and the viewing of the visual image 96 by a media consumer facilitates understanding of the meaning of the corresponding, selected audio component portion.

Figure 5:
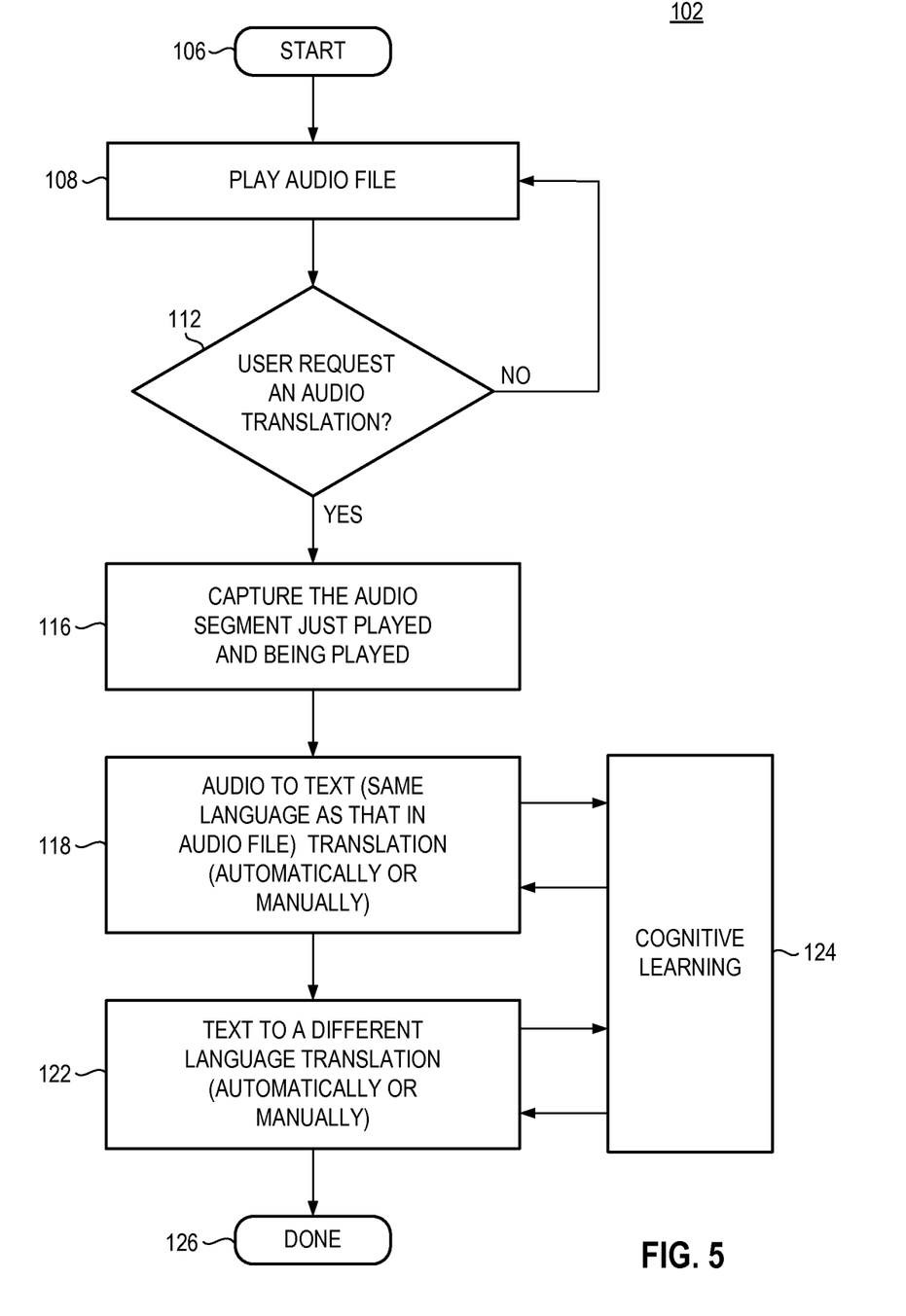
FIG. 5 illustrates a process diagram representative of the process of operation of an implementation of the present disclosure.

FIG. 5 illustrates a process diagram 102 representative of the process of operation of an implementation of the present disclosure in which an audio component of a media portion is selected, and a textual representation thereof is formed. Here, specifically, the process 102 is representative of a process relating to playback of an audio book or other audio file and conversion of a portion thereof into textual form.

Subsequent to start, indicated by the start block 106, the audio file is played back, indicated by the block 108. A determination is made, indicated by the decision 112, as to whether there has been a request for further review, i.e., audio translation, of a portion of the played-back audio. If not, the No branch is taken back to the block 108, and playback of the audio file continues.

If, conversely, a request is detected, the Yes branch is taken to the block 116. At the block 116, an audio segment is captured in response to the request. The audio segment that is captured comprises a portion of the audio file currently being played and a just-played portion of the audio file. The audio segment that is captured is, e.g., a short segment captured forwards and/or backwards in time to provide sufficient context for the captured audio. The audio segment comprises, as a result, the current sentence that is played back for audio media corresponding to a pre-defined time length, e.g., a preceding several seconds of the audio file.

In one implementation, the segment, once captured, is played back to the listener of the audio file to provide for listener confirmation that the captured segment is the segment in which the listener has interest to further review.

Once captured, and if so-configured, confirmed by the user, the captured audio segment is converted into textual form to form a textual representation of the audio segment, as indicated by the block 118. The conversion is carried out either automatically or manually responsive to user command entered, e.g., by way of an input actuator. As described previously, the textual representation is displayed to the user.

Additionally, and as indicated by the block 122, if selected, the textual representation is translated into a second language. The language is, e.g., preselected or selected by the user. Once translated, and as also described previously, the translated, textual representation is displayed to the user. The process 102 further illustrates cognitive learning, represented by the block 124. Cognitive learning provides for alteration in, e.g., playback of the audio file of subsequently played-back audio responsive to the request for audio translation. Additionally, cognitive learning is utilized to facilitate translation of the textual representation into the second language. For instance, cognitive learning is utilized to identify words in audio segments that are frequently selected for further review and to add the words, and translations of the words, to a local dictionary to minimize the need to utilize a remote database or translator to form the translation. In an alternate implementation, content being played back is automatically recognized, and textual representations are automatically created and displayed. The displayed textual representations are, in this and other implementations, integrated with the playback of the audio media. The process 102 ends at block 126.

In one implementation of the present disclosure, the media forms a multimedia production, such as a movie. Speech-to-text conversion is carried out and translation is carried out as the film is played back. As the film represents a uni-directional communication playback, the input is stopped or buffered, as needed, in order to permit formation of the textual representation and translation, whenever needed.

Figure 6:
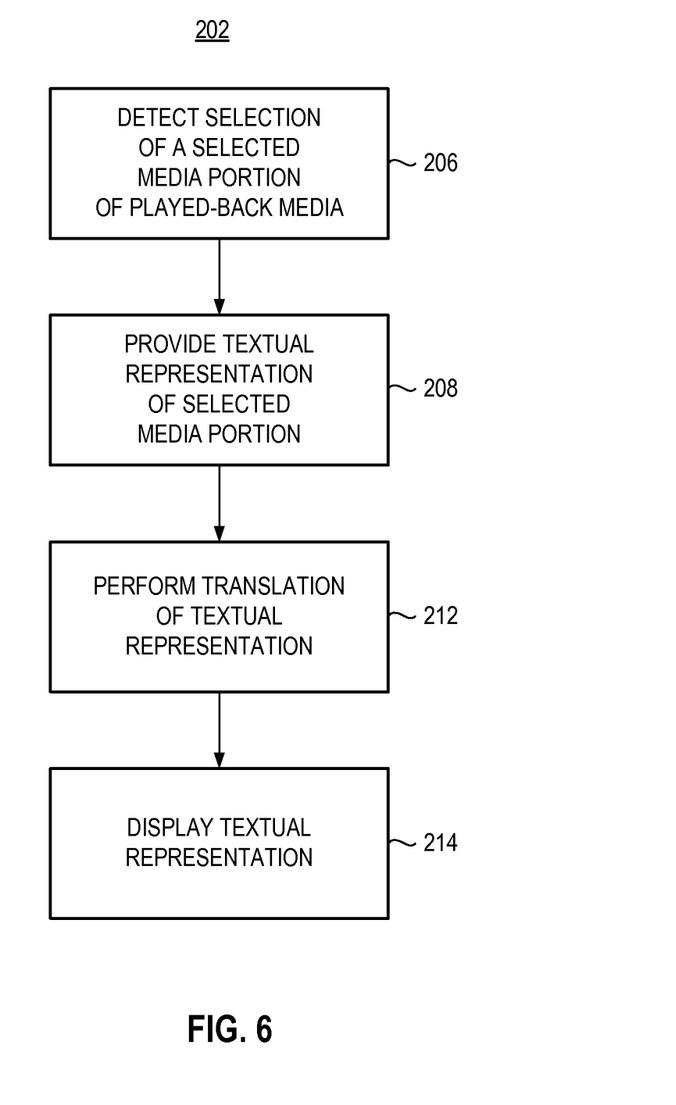
FIG. 6 illustrates a method flow diagram representative of the method of operation of an implementation of the present disclosure.

FIG. 6 illustrates a method flow diagram representative of the method of operation of an implementation of the present disclosure. The method 202 facilitates understanding of media playback at a device having media playback functionality. First, and as indicated by the block 206, detection is made of selection of a selected media portion of a media played back by the media playback functionality. Then, and as indicated by the block 208, a textual representation of the selected media portion is provided.

If selected, and as indicated by the block 212, translation is performed upon a portion of the textual representation. Then, and as indicated by the block 214, the textual representation is displayed, either in the language in which the representation is first formed or subsequent to translation.

Thereby, a manner is provided by which to permit a consumer of media having an audio component to have a representation thereof formed to increase the understanding of the audio component. An integrated solution of audio capture and on-demand translation to text and/or a different language is provided. Speech recognition and/or language translation as well as display of the resultant textual representation is displayed only when needed, thereby to conserve battery power. Through cognitive learning, improved operation is provided. For example, a media consumer need not frequently select the word and request translation, as through cognitive learning, such operations are automatically carried out.

Presently preferred implementations of the disclosure and many improvements and advantages thereof have been described with a degree of particularity. The description is of preferred examples of implementing the disclosure, and the description of examples is not necessarily intended to limit the scope of the disclosure. The scope of the disclosure is defined by the following claims.

What is claimed is:

1. An apparatus for a device having media playback functionality, said apparatus comprising:
    a detector, comprising a processor, configured to detect selection of a portion of media played back by the media playback functionality, the portion of media comprising media occurring within a time window that is based on a selected time proximity to a temporal indication associated with the selection;
    a converted-form media provider configured to provide a converted-form media representation of the selected media portion; and
    a display element configured to display the converted-form media representation provided by said converted-form media provider.

2. The apparatus of claim 1 wherein the portion of media is played back in a first language and wherein the converted-form media representation displayed at said display element is displayed in a second language.

3. The apparatus of claim 1 wherein said converted-form media provider comprises a text provider configured to provide a textual representation of the portion of media.

4. The apparatus of claim 1 wherein said detector is configured to detect an input indicative of the selection, and wherein said detector is further configured to identify the portion of media.

5. The apparatus of claim 4 wherein the portion of media comprises a sentence of the media played back within the selected time proximity to the temporal indication.

6. The apparatus of claim 1 wherein said converted-form media provider further comprises a language translator configured to translate at least a portion of a representation of the portion of media, provided in a first language, into a second language.

7. The apparatus of claim 6 wherein said language translator is configured to select whether to automatically translate the at least the portion of the representation of the portion of media.

8. The apparatus of claim 1 further comprising a media portion capturer configured to capture the portion of media.

9. The apparatus of claim 1 further comprising a playback speed instructor configured to instruct a speed at which the media playback functionality plays back the media responsive to a rate at which said detector detects selection of the portion of media.

10. The apparatus of claim 9 wherein said speed instructor is configured to decrease the speed at which the media playback functionality plays back the media of which the portion of media forms a portion.

11. The apparatus of claim 1 wherein said converted-form media provider is configured to provide an image related to the portion of media.

12. A method for facilitating understanding of media played back at a device having media playback functionality, said method comprising:
   detecting selection of a portion of the media played back by the media playback functionality, the portion of media comprising media occurring within a time window that is based on a selected time proximity to a temporal indication associated with the selection;
   generating a converted-form media representation of the portion of media; and
   displaying the converted-form media representation via a display element configured to display the converted-form media representation.

13. The method of claim 12 wherein said generating further comprises translating at least a portion of the portion of media from a first language to a second language.

14. The method of claim 13 wherein said displaying comprises displaying the at least the portion of the portion of media once translated.

15. The method of claim 12 wherein said generating comprises generating a visual representation of the portion of media.

16. An apparatus for a media player configured to play back media having an audio component, said apparatus comprising:
   an input selection detector, comprising a processor, configured to detect input of selection to review a portion of played-back media of the media, the portion of played-back media comprising media occurring within a time window that is based on a selected time proximity to a temporal indication associated with the selection;
   a converter configured to convert the audio component of the portion of the played-back media into a converted-form representation; and
   a displayer configured to display the converted-form representation of the audio component converted by said converter.

* * * * *